Oct. 23, 1945.　　　L. P. CROSMAN　　　2,387,647
ORIENTING INSTRUMENT
Filed June 16, 1943　　　2 Sheets-Sheet 1

Witness
Elmer W. Edwards

INVENTOR
Loring P. Crosman
BY
Stuart Hill
ATTORNEY

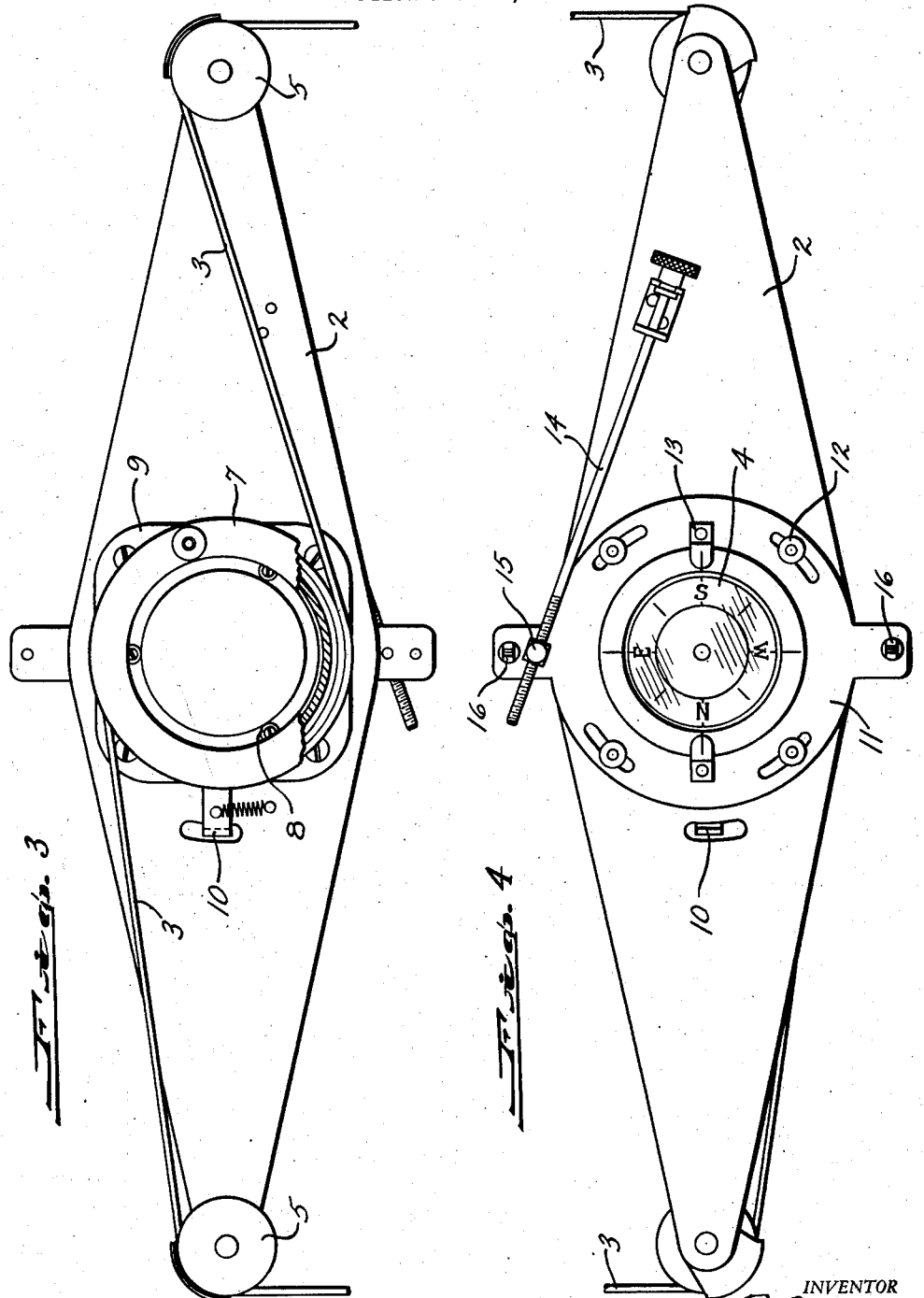

Patented Oct. 23, 1945

2,387,647

UNITED STATES PATENT OFFICE 2,387,647

ORIENTING INSTRUMENT

Loring Pickering Crosman, South Orange, N. J., assignor to Monroe Calculating Machine Company, Orange, N. J., a corporation of Delaware Application June 16, 1943, Serial No. 491,259

7 Claims. (Cl. 33—224)

The invention relates to orienting instruments, whereby a vehicle, such as an airplane, or land vehicle, may be brought to rest in a series of given differently oriented positions, as is necessary in verifying the readings of a compass mounted in the vehicle and subject to variations caused by the presence of disturbing local influences.

Commonly, vehicles have been oriented by marking out upon the ground an eight sided rose, oriented to the cardinal and inter-cardinal points of the compass, the vehicle being aligned with the lateral marks successively. In each aligned position, the compass compensators are adjusted to bring the correct point to the lubber line. The laying out of such a rose is a complicated and time consuming operation and the accurate alignment of the vehicle is troublesome, all of which may be avoided by the use of the present invention.

According to the invention, a master compass is provided with means whereby it may be held at a sufficient distance from the vehicle to be outside of the field of local disturbance, and in given angular relation to the vehicle. Thus the readings of the two compasses may be compared, in different positions of the vehicle determined by the bearings of the master compass, and the vehicle compass compensated as may be necessary.

The invention consists in the novel construction and combination of parts, as set forth in the appended claims.

In the accompanying drawings, illustrating the invention:

Fig. 3 is a top plan view of the instrument.

Fig. 4 is a bottom plan view of the same.

Figure 1:
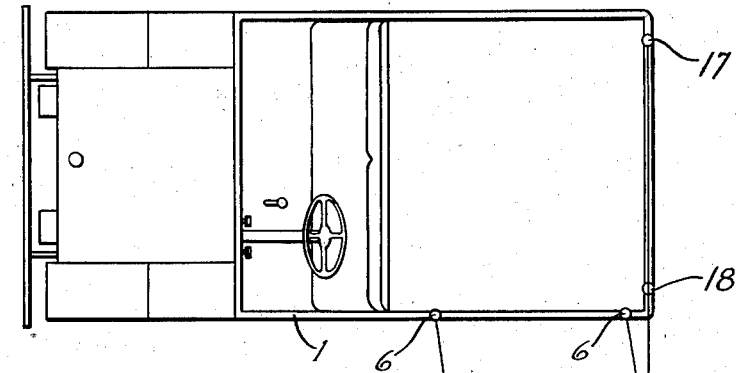
Fig. 1 is a diagrammatic view, illustrating a preferred method of checking the angular relation of the instrument to a vehicle.

In Figure 1 of these drawings the numeral 1 designates a car or "jeep" upon which a magnetic compass is assumed to be mounted, and 2 is the orienting instrument designed for attachment to the car by parallel cables 3, 3. The instrument comprises an elongated frame 2 upon which a magnetic compass 4 is mounted, the cables 3, 3 being secured to the frame and led over pulleys 5, 5 mounted in the ends of the frame.

The free ends of the cables are designed for removable attachment to fixtures 6, 6 upon the vehicle, these fixtures being located parallel to the longitudinal axis of the vehicle and spaced apart by an interval equal to the length of the frame 2. Thus when the instrument is held with the cables 3, 3 fully extended, these cables form two sides of a parallelogram, the other sides of which are formed by the longitudinal axes of the instrument and of the vehicle.

In use, the vehicle is driven in an arc about the operator at the instrument, being stopped upon signal from the operator as it comes approximately to position facing one of the cardinal or inter-cardinal points. During the movement of the vehicle the operator, holding the frame 2 in both hands, turns, keeping an even tension upon the cables. The vehicle having stopped, the operator, by reference to the lubber line of compass 4, informs the assistant in the vehicle how far the orientation differs from the desired point (as minus two degrees, or plus one degree), whereupon the assistant adjusts the compensators to bring the vehicle compass into conformity.

The parallelogram arrangement is of particular advantage since it has been found to be easier to bring the instrument into alignment with the vehicle by a mere tensioning of the cables, rather than by sidewise movement of the operator, as would be necessary if the cables were attached at a single point to the vehicle.

The frame 2 is made of wood, plastic or other non-magnetic material and the cables 3, 3 are made up of strands of non-magnetic metal woven in such a manner as to provide against stretching and to reduce the tendency to kink. Any of the commercial cables which meet these requirements may be used for the purpose.

Figure 2:
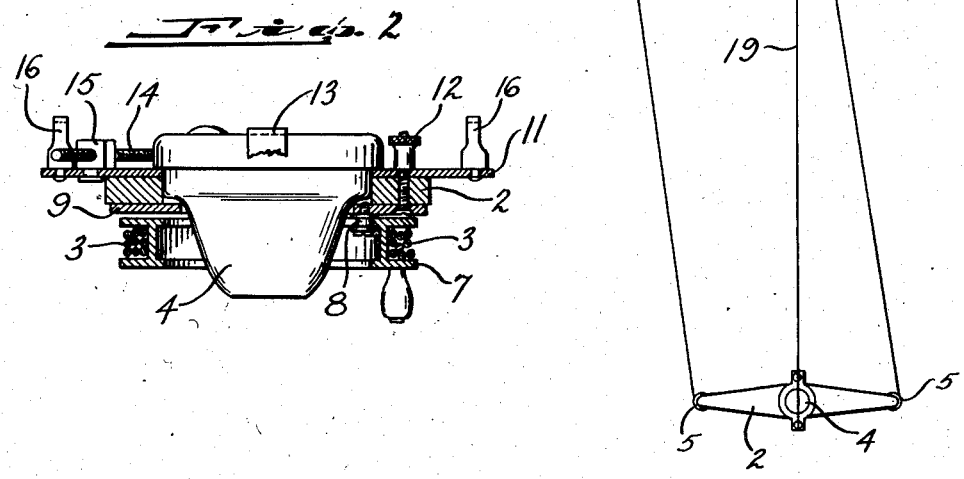
Fig. 2 is a transverse vertical section through the instrument.

Preferably, as seen in Figs. 2 and 3, the cables are attached to a reel 7 rotatably mounted upon the frame 2 by means of rollers 8 engaging an annular track formed in the reel and supported from a plate 9, fastened to the frame, the cables being attached to opposite sides of the reel. A spring brake (not shown), of conventional design may engage the reel, and be released by the operator as the cable is wound upon the reel.

When the instrument is used over a considerable period of time it will need occasional checking up to determine whether the cables continue to keep it in parallel relation to the vehicle. For the purpose of making any corrections necessary to bring the instrument into parallelism means are provided for adjusting the cables and the compass 4 relatively to each other. Obviously this could be done by adjusting one or both of the cables to change the effective length thereof or, as herein shown, by adjusting the unit of the compass upon which the lubber line is marked relatively to the frame 2. Where compasses are employed having a card located close to the upper surface of the casing, the adjustable unit may consist of an annular plate having the lubber line marked upon the inner marginal face thereof, and the compass case may be fixed in the frame 2. However, compasses of this character usually have a card spaced some distance below the upper face or glass of the casing, and the lubber line consists of a vertical mark on the interior wall of the casing. To provide for this condition the compass is rotatably mounted as shown in Figs. 2 and 4, an annular plate 11 being secured to the frame 2 by bolts passing through slots in the plate, and adjustably secured upon the frame by means of nuts 12.

The compass case is formed with a flange, overlying the inner marginal portion of the annular plate and is secured rigidly to the plate by means of clamps 13, the compass bowl extending downwardly into a central opening through frame 2 and through the opening in the plate 9. When it is desired to adjust the compass the nuts 12 are loosened and plate 11 is rotated by means of a threaded rod 14 engaging the threaded seat of a post 15 pivotally mounted in plate 11.

For the purpose of determining when the compass 4 has been brought into proper relation to the vehicle two diametrically opposite spaced sights or posts 16, 16 may be provided, these posts being fixed in the annular plate 11 and extending upward therefrom. The tops of the posts 16 are marked as by the provision of a notch, these notches being designed to be brought into line with two fixtures or sights 17, 18 upon the vehicle (Fig. 1), these fixtures being located parallel to the transverse axis of the vehicle. A cord 19 may be stretched between the points 16, 16, 18, 17, being attached, for instance, to fixture 17, extended above a mark of fixture 18 and engaged with the notches of the posts 16, 16, the free end of the cord being weighted. By adjusting the compass 4 until cord 19 shows that the four sighting points 16, 16, 17 and 18 have been brought into line, the lubber line of compass 4 will be accurately located relative to the major axis of the vehicle. The check-up having been made cord 19 is removed, and the instrument operated as previously described.

It will be obvious that other methods of verifying the bearing of compass 4 may be employed, but the above described arrangement is extremely simple and easily applied.

I claim:

1. Means for orienting a vehicle provided with a magnetic compass having the usual compensator, comprising an elongated portable frame having mounted thereon centrally of its length a master magnetic compass and means adapted for connecting opposite ends of said frame with certain spaced points of the vehicle to maintain in parallel relation the longitudinal axes of said frame and of said vehicle throughout a series of differently oriented positions of said vehicle, said means including flexible cables carried by and extending from opposite ends of said frame and of length sufficient to locate the master compass of said frame outside the field of local disturbances to which the compass of said vehicle would be subject.

2. Means for orienting a vehicle provided with a magnetic compass having the usual compensator, comprising an elongated portable frame having mounted thereon centrally of its length a master magnetic compass and means adapted for connecting opposite ends of said frame with certain spaced points of the vehicle to maintain in parallel relation the longitudinal axes of said frame and of said vehicle throughout a series of differently oriented positions given the vehicle, said means including flexible cables carried by and extending from opposite ends of said frame and of length sufficient to locate the master compass of said frame outside the field of local disturbances to which the compass of said vehicle would be subject, and means for verifying said parallel relation.

3. Means for orienting a vehicle provided with a magnetic compass having the usual compensator, comprising an elongated portable frame having mounted thereon centrally of its length a master magnetic compass and means adapted for connecting the opposite ends of said frame with certain spaced points of the vehicle to maintain in parallel relation the longitudinal axes of said frame and of said vehicle throughout a series of differently oriented positions given the vehicle, said means including flexible cables carried by and extending from the opposite ends of said frame and of length sufficient to locate the master compass of said frame outside the field of local disturbances to which the compass of said vehicle would be subject, means to verify said parallel relation and means to compensate for variations from the parallel relation of the longitudinal axes of said frame and of said vehicle.

4. Means for orienting a vehicle provided with a magnetic compass having the usual compensator, comprising an elongated portable frame having mounted thereon centrally of its length a master magnetic compass and means adapted for connecting the opposite ends of said frame with certain spaced points of the vehicle to maintain in parallel relation the longitudinal axes of said frame and of said vehicle throughout a series of differently oriented positions given the vehicle, said means including flexible cables carried by and extending from opposite ends of said frame and of length sufficient to locate the master compass of said frame outside the field of local disturbances to which the compass of said vehicle would be subject, and means for verifying said parallel relation including diametrically opposite spaced sights of said master compass adapted for alignment with the transverse axis of said vehicle.

5. Means for orienting a vehicle provided with a magnetic compass having the usual compensator, comprising an elongated portable frame having mounted thereon centrally of its length a master magnetic compass and means adapted for connecting opposite ends of said frame with certain spaced points of the vehicle to maintain in parallel relation the longitudinal axes of said frame and of said vehicle throughout a series of differently oriented positions given the vehicle, said means including flexible cables carried by and extending from opposite ends of said frame and of length sufficient to locate the master compass of said frame outside the field of local disturbances to which the compass of said vehicle would be subject, and means to compensate for variations from the parallel relation of the longitudinal axes of said frame and of said vehicle.

6. Means for orienting a vehicle provided with a magnetic compass having the usual compensator, comprising an elongated portable frame having mounted thereon centrally of its length a master magnetic compass and means adapted for connecting opposite ends of said frame with certain spaced points of the vehicle to maintain in parallel relation the longitudinal axes of said frame and of said vehicle throughout a series of differently oriented positions given the vehicle, said means including flexible cables carried by and extending from opposite ends of said frame and of length sufficient to locate the master compass of said frame outside the field of local disturbances to which the compass of said vehicle would be subject, and means to compensate for variations from the parallel relation of the longitudinal axes of said frame and of said vehicle including means of adjustment for the bowl of the master compass relative to said frame.

7. Means for orienting a vehicle provided with a magnetic compass having the usual compensator, comprising an elongated portable frame having mounted thereon centrally of its length a master magnetic compass and means adapted for connecting opposite ends of said frame with certain spaced points of the vehicle to maintain in parallel relation the longitudinal axes of said frame and of said vehicle throughout a series of differently oriented positions given the vehicle, said means including flexible cables carried by and extending from opposite ends of said frame and of length sufficient to locate the master compass of said frame outside the field of local disturbances to which the compass of the vehicle would be subject, and a reel mounted upon said frame centrally of the length thereof, said cables being oppositely wound upon said reel, said reel having a handle for control of said cables.

LORING PICKERING CROSMAN.